Patented Jan. 19, 1926.

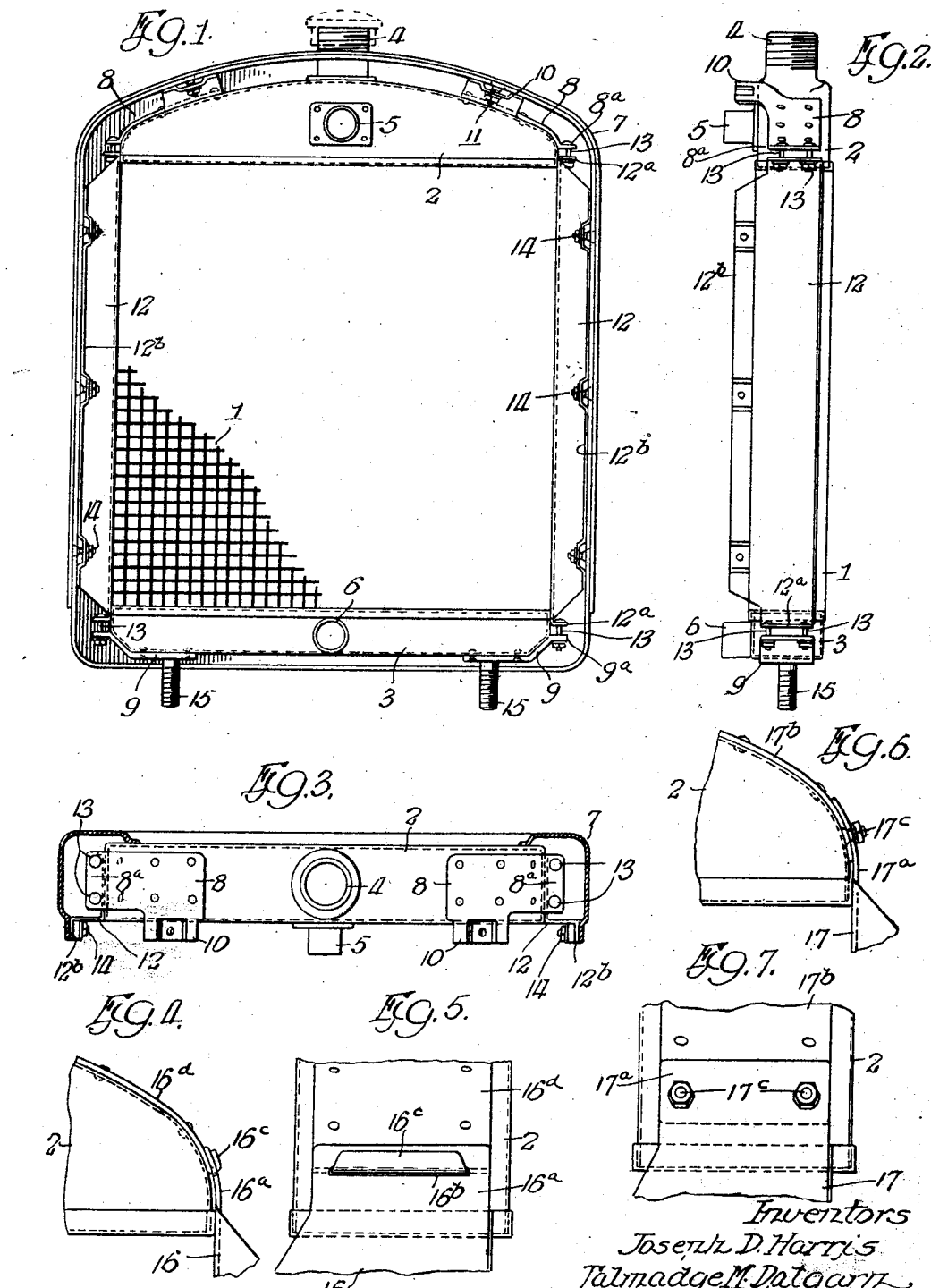

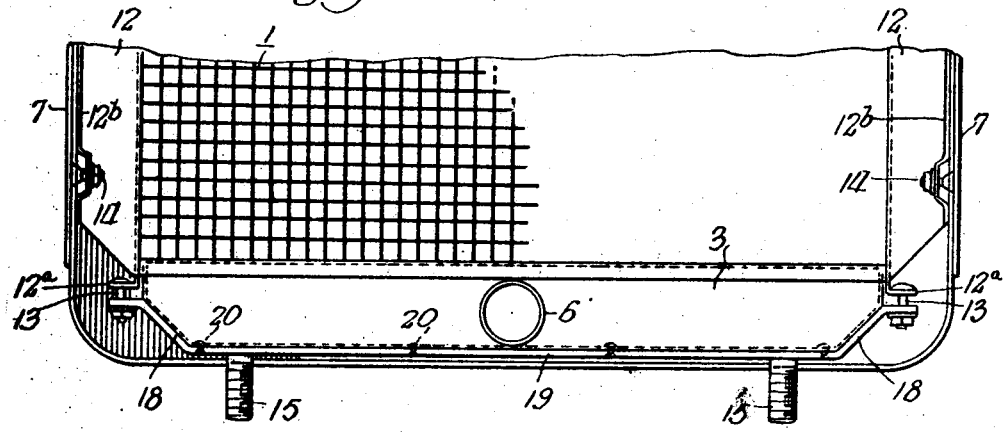
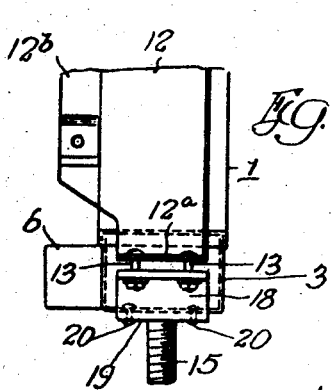
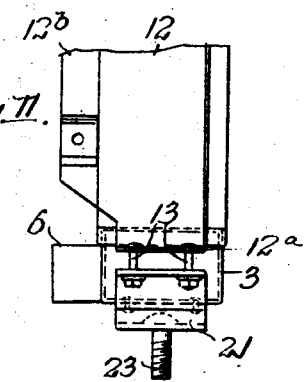
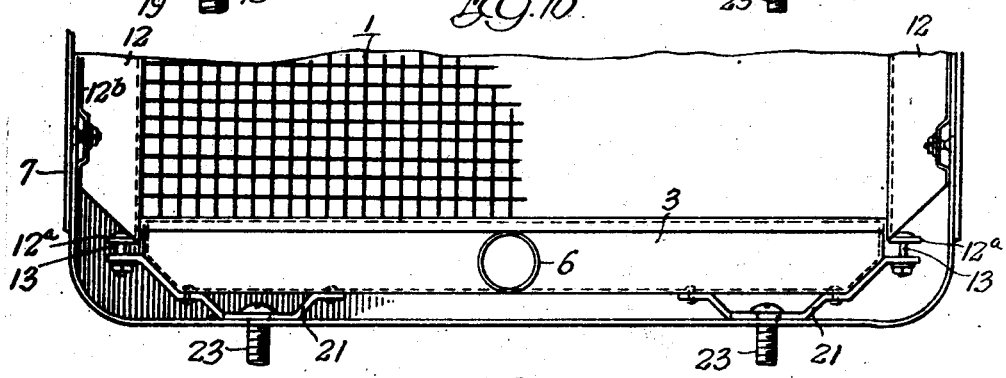
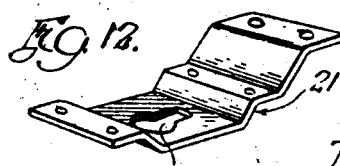

1,570,142

UNITED STATES PATENT OFFICE.

JOSEPH D. HARRIS AND TALMADGE M. DALGARN, OF DETROIT, MICHIGAN.

RADIATOR FOR MOTOR VEHICLES.

Application filed April 22, 1921. Serial No. 463,561.

*To all whom it may concern:*

Be it known that we, JOSEPH D. HARRIS and TALMADGE M. DALGARN, both citizens of the United States, and both residing at Detroit, in the county of Wayne and State of Michigan, have invented new and useful Improvements in Radiators for Motor Vehicles, of which the following is a specification.

This invention relates to radiators for motor vehicles, such as automobiles, tractors, and the like, and consists in the matters hereinafter described and more particularly set forth in the appended claims.

In the accompanying drawings—

Fig. 1 is a rear view of a radiator embodying the features of our invention;

Fig. 2 is a side view of the same with the outer casing or shell omitted for the purposes of illustration;

Fig. 3 is a top plan view of the radiator with the outer casing or shell in horizontal section;

Figs. 4 to 7, inclusive, show two different ways in which the core channels or bolting strips may be releasably connected with the brackets on the upper tanks;

Fig. 8 is a rear view of the lower or bottom portion of a radiator, and showing the lower brackets in one piece;

Fig. 9 is a side view of the parts shown in Fig. 8, the outer shell or casing being omitted;

Fig. 10 is a rear view of the parts, such as shown in Fig. 8, with the lower brackets made separate and provided with key slots for the purpose to be hereinafter described;

Fig. 11 is a side view of the parts shown in Fig. 10, the outer shell or casing being omitted; and Fig. 12 is a perspective view of one of the lower brackets employed in the mounting shown in Figs. 10 and 11.

The radiator shown in Fig. 1 comprises a core 1, illustrated in conventional form and having such design as desired in conformity with radiator construction. This core, through which the cooling water circulates, is located between and opens into upper and lower tanks 2, 3, the core being soldered to said tanks, as usual. The upper tank 2 has a filling neck 4 closed by a cap, as customary, and also has an inlet opening 5 at the rear, as shown. The bottom tank 3 has an outlet opening 6, also at the rear, and the assembled core and tanks are located in an outer casing or shell 7 of any conventional design adapted for the particular shape and design of the assembled core and tanks.

Secured to the top wall of the upper tank 2, are two brackets 8, 8, one adjacent each end of the tank, as shown in Figs. 1 to 3, and secured in like arrangement to the under side of the bottom wall of the lower tank 3 are two brackets 9, 9, as shown on Fig. 1. These brackets are rigidly secured to their respective tanks by rivets, as shown, and the upper brackets 8 each have an upwardly offset and rearwardly projecting lug 10 to engage against the under side of the top portion of the shell 7 over said upper tank and secured thereto by a bolt 11, as indicated in Fig. 1.

On opposite sides of the core 1 are vertically arranged bolting strips or channels 12, 12, one at each side of the core, and extending between the brackets 8 and 9, as shown. The ends of the brackets extend outward from the tanks to provide flanges or lugs 8ª, 9ª, and the bolting strips 12 have similar flanges or lugs 12ª to permit bolts 13 to clamp the ends of the strips to the brackets. The bolting strips 12, 12, as shown in Figs. 1 and 2, are made slightly shorter than the distance between their respective brackets 8, 9, so that when the bolts 13 are tightened the entire core and tank structure are drawn and held tightly together, relieving the soldered joints of such structure of all strains. The bolting strips 12 are not secured to the core 1 or to the ends of the tanks (except by the brackets), so that before the bolting strips are applied or in case of repairs to the core and tank structure, the bolting strips not being in place or being removed by removing the bolts 13, the ends of the tanks and the sides of the core are exposed so that any leaks at these points may be readily reached and be easily soldered, without hindrance or interference by the bolting strips or the brackets. It is to be observed that the flanges 8ª, 9ª of the brackets do not extend over or overlap the joints between the core and the ends of the tanks, nor do the brackets cover any seams or joints between such parts, thus permitting such joints and seams to be exposed and readily reached for repair when the bolting strips are not in place.

The fact that the bolting strips 12, 12 are not soldered to either the core or the tanks, permits the assembled core and tank structure to be completed and tested for leaks, caused by defects in the material as well as workmanship and also by handling, before the bolting strips are applied. This permits all soldering to be done on the assembled core and tanks before the first test is made for leaks, by subjecting the assembled structure to air pressure while submerged in water. The brackets 8, 9 do not cover any joints or seams between the tanks and the core, and, the brackets being riveted to the tanks, there is no soldering required for such connections, other than necessary to seal the joints at the rivets by soldering or sweating over both ends of the rivets. Thus, before the bolting strips 12 are applied, all joints and seams in the assembled core and tank structure are exposed, and only one test is required for leaks, and these may be readily reached and easily soldered and the work done in much shorter time than heretofore, because all seams and joints are exposed and readily accessible. This reduces the number of tests for leaks to one, thereby reducing the labor required in the manufacture of radiators because all leaks can be located and soldered at one and a final operation in the process of building the radiator. This also effects a considerable saving in the cost of manufacture.

Then again, the fact that the bolting strips 12, 12 have releasable or detachable connection with the brackets, renders it unnecessary that any solder joints be loosened or disturbed when removing the strips to expose the sides of the core and end seams of the tanks for repair, nor when building the structure need these strips be soldered in place over the ends of the tanks and sides of the core.

The bolting strips 12 being shorter in length than the distance between the brackets 8, 9, permits these strips to be made from scrap material, of which there is always an abundance about a radiator manufacturing plant, thus further effecting a saving in material used, as the parts do not have to be cut from large sheets. This is also applicable to the brackets 8, 9, as they, as shown in the drawings, are made separate and thus may be readily made from scrap material.

To connect the assembled core and tanks to the outer casing or shell 7, the bolting strips 12 are provided with flanges 12$^b$, which engage against the inside of the shell, as shown in Figs. 1 and 3, and are secured thereto by bolts 14.

In the arrangement shown in Figs. 1 to 3, the core and tank structure, while secured to the shell 7, is not suspended therein, but is supported on the chassis of the vehicle on which the radiator is mounted. This is accomplished by providing each of the lower brackets 9 with a depending threaded lug 15, which extends downward into the chassis (not shown) of the vehicle and is clamped thereto, as is apparent. The anchoring studs 15, 15 are secured to the lower brackets 9, 9 and do not extend into or pierce the bottom wall of the lower tank 3. Thus, no holes need be made in the bottom tank for the anchoring means, nor is there any need for the use of castings or expensive reinforcements in the bottom tank for such means.

By the arrangement described and shown, the assembled core and tanks may be mounted on the chassis at the proper stage in the assembly of the automobile without the shell, and the latter need not be applied until all the other parts are in place and tested. This avoids damaging the highly finished surface of the shell by workmen using tools or handling material, and this is an advantage because it will effect a large saving in the replacement of damaged shells.

Instead of using bolts 13 for connecting the upper end of the bolting strips 12 to their respective upper brackets 8, as illustrated in Figs. 1 to 3, we may employ the forms shown in Figs. 4 to 7. As shown in Figs. 4 and 5, the bolting strip 16 has its upper end 16$^a$ extended vertically upward instead of bent outward, as in Figs. 1 to 3, and is provided with a transverse slot 16$^b$ to receive the hook shaped end 16$^c$ of the upper bracket 16$^d$. In Figs. 6 and 7, the bolting strip 17 has its upper end 17$^a$ extended vertically upward, as before, and overlaps the adjacent end of the upper bracket 17$^b$, the two overlapping parts being clamped together by bolts 17$^c$ carried by the bracket and extending through holes in the end portion 17$^a$, as shown.

The bottom brackets, instead of being separate as shown in Fig. 1, may be made in one piece, as shown in Figs. 8 and 9. Here the bottom brackets are indicated by 18, 18 formed at the ends of a flat bar or strip 19 extending entirely across the bottom tank 3 beneath the bottom wall thereof and secured thereto by rivets 20, as shown. This form ties the structure laterally and makes a strong structure.

To permit the use of bolts instead of threaded studs for anchoring the radiator to the chassis, we provide the form of structure shown in Figs. 10 and 11. As illustrated, the bottom brackets 21, 21 are riveted to the under side of the bottom tank, as before, only that each has a portion between its ends offset downward and provided with a key hole slot 22 to receive a bolt 23. By shifting the assembled core and tanks laterally in one direction, the heads of said bolts 23 register with the enlarged ends of said slots and will pass through them when the structure is lifted from the chassis, or will pass through the slots when the structure is applied to the chassis. Then by shifting the structure in the opposite direction, the heads will extend over the narrower ends of the slots and act to hold the same anchored in place on the chassis.

While we have shown and described herein in detail a radiator structure embodying the features of our invention, it is to be of course understood that the details of construction and arrangement of parts illustrated, may be variously changed and modified without departing from the spirit and scope of our invention.

We claim as our invention:

1. A radiator for motor vehicles, comprising an outer casing or shell, upper and lower tanks and an interposed core located in said shell, said core being secured to said tanks, brackets carried by said tanks at the ends thereof, vertical strips extending between said brackets at the sides of the core but having no connection therewith, and means for releasably clamping the ends of said strips to said brackets, said means on clamping the strips to the brackets acting to draw the tanks and core tightly together, said strips being secured to the sides of said shell for holding the assembled core and tanks therein.

2. A radiator for motor vehicles, comprising an outer casing or shell, upper and lower tanks and an interposed core located in said shell, said core being secured to said tanks, brackets secured to said tanks at the ends thereof, vertical strips extending between said brackets at the sides of the core but having no connection therewith, and means for releasably clamping the ends of said strips to said brackets, said strips having their ends terminating short of said brackets so that on being clamped thereto the tanks and core will be drawn tightly together, said strips being secured to the sides of said shell for holding the assembled core and tanks therein.

3. A radiator for motor vehicles, comprising an outer casing or shell, upper and lower tanks and an interposed core located in said shell, said core being secured to said tanks, brackets secured to said tanks at the ends thereof, and having outwardly projecting flanges spaced, respectively, above and below the joints between the ends of said tanks and core, vertical strips extending between said brackets at the sides of said core but having no connection therewith, said strips having outwardly projecting flanges at their ends terminating short of the flanges on said brackets, and bolts engaging the flanges on said brackets and strips for releasably clamping the same together, said strips being bolted to the sides of said shell for holding the assembled core and tanks therein.

4. A radiator for motor vehicles, comprising an outer casing or shell, upper and lower tanks and an interposed core located in said shell, said core being secured to said tanks, brackets secured to said tanks at the ends thereof and having outwardly projecting flanges spaced, respectively, above and below the joints between the ends of said tanks and core, vertical strips extending between said brackets at the sides of said core but having no connection therewith, said strips having outwardly projecting flanges at their ends terminating short of the flanges on said brackets, and bolts engaging the flanges on said brackets and strips for releasably clamping the same together, said strips being bolted to the sides of said shell for holding the assembled core and tanks therein, the brackets on the lower tank being formed at the ends of a bar secured to the under side of said lower tank and extending across the same.

5. A radiator for motor vehicles, comprising an outer casing or shell, upper and lower tanks and an interposed core located in said shell, said core being secured to said tanks, brackets secured to said tanks at the ends thereof, vertical strips extending between said brackets at the sides of the core, and means releasably clamping the ends of said strips to said brackets, each of said strips being formed to provide two flanges, one being along the adjacent side of the core but having no connection therewith, and the other flange extending outward toward the sides of said shell and being fastened thereto for holding the assembled core and tanks in said shell.

6. A radiator for motor vehicles, comprising an outer casing or shell, upper and lower tanks and an interposed core located in said shell, said core being secured to said tanks, brackets secured to said tanks at the ends thereof, vertical strips extending between said brackets at the sides of the core, means releasably clamping the ends of said strips to said brackets, each of said strips being formed to provide two flanges, one being along the adjacent side of the core but having no connection therewith, and the other flange extending outward toward the sides of said shell and being fastened thereto for holding the assembled core and tanks in said shell, the brackets on the lower tank extending toward each other under the same, and threaded studs carried by said brackets and extending downward therefrom below said shell.

In testimony that we claim the foregoing as our invention, we affix our signatures, this fourteenth day of April, A. D. 1921.

JOSEPH D. HARRIS.
TALMADGE M. DALGARN.